US012609548B2

(12) United States Patent
Yan et al.

(10) Patent No.: US 12,609,548 B2
(45) Date of Patent: Apr. 21, 2026

(54) METHOD, SYSTEM AND DEVICE FOR CONTROLLING POWER SHARING OF A CLUSTER OF CHARGING PILES

(71) Applicant: Delta Electronics (Shanghai) Co., Ltd., Shanghai (CN)

(72) Inventors: Chao Yan, Shanghai (CN); Fugui Dai, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 960 days.

(21) Appl. No.: 17/810,827

(22) Filed: Jul. 5, 2022

(65) Prior Publication Data

US 2023/0086648 A1 Mar. 23, 2023

(30) Foreign Application Priority Data

Sep. 17, 2021 (CN) .......................... 202111094782.6

(51) Int. Cl.
*H02J 7/00* (2006.01)
*B60L 53/67* (2019.01)

(52) U.S. Cl.
CPC ............. *H02J 7/0048* (2020.01); *B60L 53/67* (2019.02)

(58) Field of Classification Search
CPC .... H02J 7/0048; H02J 2310/48; H02J 7/0013; H02J 7/00712; H02J 7/02; H02J 7/04; H02J 1/14; B60L 53/67; B60L 53/11; B60L 53/62; B60L 53/63; Y02T 10/70; Y02T 10/7072; Y02T 90/12
See application file for complete search history.

(56) References Cited

U.S. PATENT DOCUMENTS

| | | | |
|---|---|---|---|
| 2008/0297110 A1 | 12/2008 | Cordes | |
| 2013/0057210 A1* | 3/2013 | Nergaard | B60L 53/11 |
| | | | 320/109 |
| 2016/0325634 A1* | 11/2016 | Foldesi | H02J 7/0042 |

FOREIGN PATENT DOCUMENTS

| | | | | |
|---|---|---|---|---|
| CN | 107994654 A | 5/2018 | | |
| CN | 108832682 A | 11/2018 | | |
| CN | 108879831 A | * 11/2018 | ............ | H02J 7/0026 |
| CN | 109532549 A | 3/2019 | | |
| CN | 109572478 A | 4/2019 | | |
| CN | 106712166 B | 10/2019 | | |
| CN | 111845423 A | 10/2020 | | |
| CN | 112319293 A | 2/2021 | | |

(Continued)

*Primary Examiner* — Zhipeng Wang
(74) *Attorney, Agent, or Firm* — CKC & Partners Co., LLC

(57) ABSTRACT

The disclosure provides a method, system and device for controlling power sharing of a cluster of charging piles, comprising calculating a remaining power of the cluster at a current time according a total power upper limit of the cluster at the current time, a total number of charging piles of the cluster at the current time and an actual output power of each charging pile; calculating a weight of each charging pile for distributing the remaining power according to performance state of each charging pile; and obtaining a power output upper limit distributed to each charging pile at the next time according to the remaining power at the current time, the weight and the actual output power of each charging pile. The disclosure automatically adjusts the power output upper limit distributed to each charging pile in real time, thereby improving equipment utilization and load utilization of the charging station.

13 Claims, 3 Drawing Sheets

(56)         References Cited

FOREIGN PATENT DOCUMENTS

| CN | 112653163 | A | 4/2021 |
| CN | 112874364 | A | 6/2021 |
| JP | 2014161181 | A | 9/2014 |
| JP | 2015122868 | A | 7/2015 |
| TW | 202133526 | A | 9/2021 |
| WO | 2008150636 | A1 | 12/2008 |
| WO | 2021/000669 | A1 | 1/2021 |

* cited by examiner

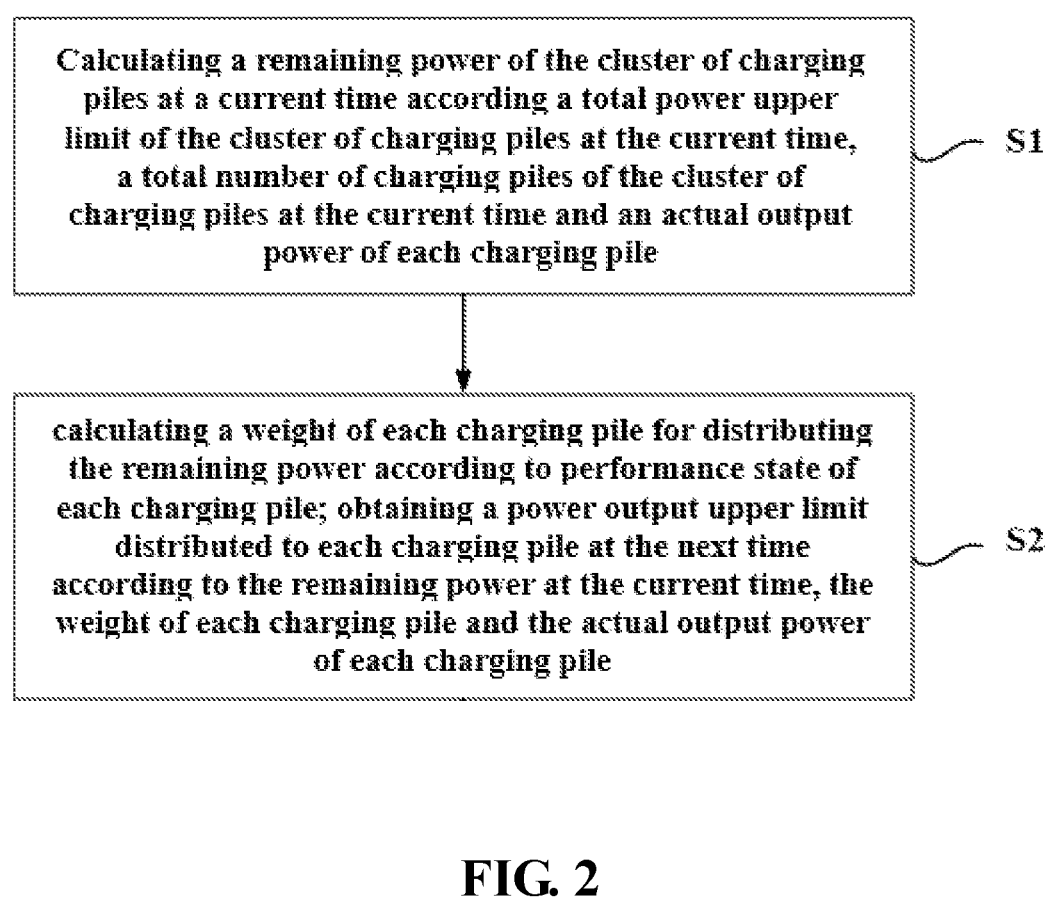

Calculating a remaining power of the cluster of charging piles at a current time according a total power upper limit of the cluster of charging piles at the current time, a total number of charging piles of the cluster of charging piles at the current time and an actual output power of each charging pile    ⟋ S1 calculating a weight of each charging pile for distributing the remaining power according to performance state of each charging pile; obtaining a power output upper limit distributed to each charging pile at the next time according to the remaining power at the current time, the weight of each charging pile and the actual output power of each charging pile    ⟋ S2

FIG. 2

METHOD, SYSTEM AND DEVICE FOR CONTROLLING POWER SHARING OF A CLUSTER OF CHARGING PILES

CROSS-REFERENCE TO RELATED APPLICATIONS

This non-provisional application claims priority under 35 U.S.C. § 119(a) on Patent Applications No. 202111094782.6 filed on Sep. 17, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the technical field of power management of cluster of charging piles, and particularly to a method, system, and device for controlling power sharing of a cluster of charging piles.

BACKGROUND

In the process of rapid charging, charging power changes greatly as SOC of the battery changes, so a total power distribution capacity can save greatly by controlling a real-time available power of each charging pile at the same station saves precisely.

A rated electrical load in a region where the charging station is located is fixed, and shall firstly satisfy residential electrical load, and the remaining available capacity is distributed to the charging station. At a time period of residential electricity consumption peak, the available load power of the charging station is often less than a sum of rated powers of all charging piles, causing decrease of the number of available charging piles, reduction of equipment utilization of the charging station, and affecting benefit of the charging station.

Based on the current situation, the available load power of the charging station shall be shared between a plurality of charging piles in the charging station, and the available load power changes along with time or electricity consumption of surrounding residents in real-time, so the method for controlling power sharing of the plurality of charging piles becomes quite important.

Currently, with respect to control of power sharing in this application, there are several schemes. The schemes of power sharing in the prior art are mainly characterized in that power is distributed in proportion based on rated powers of each charging pile (i.e., the maximum charging power of the charging piles, which is only limited by hardware of the charging piles, excluding aging of the hardware and attenuation of performance, so it can be viewed as a fixed value), so as to satisfy the dynamic available load power of the charging station. The power sharing is to distribute power again when the charging piles are added or exited. Or firstly distribute a fixed rated power to a part of charging piles, and if there are remaining powers, equally distribute the remaining powers to another part of charging piles.

In the prior art, the method for controlling power sharing substantially distributes the charging power based on the rated powers of each charging pile, while ignoring use state of each charging pile and real-time change of power demand of to-be-charged devices (e.g., new energy vehicles) connected to each charging pile.

Therefore, a method for controlling power sharing is necessary, which realizes dynamic distribution of powers of each charging pile according to the dynamic available load power of the charging station and the demand power of each charging pile changed in real.

SUMMARY

With respect to deficiencies in the prior art, the disclosure provides a method for controlling power sharing of a cluster of charging piles, comprising:

step 1, calculating a remaining power of the cluster of charging piles at a current time according a total power upper limit of the cluster of charging piles at the current time, a total number of charging piles of the cluster of charging piles at the current time and an actual output power of each charging pile; and step 2, calculating a weight of each charging pile for distributing the remaining power according to performance state of each charging pile; obtaining a power output upper limit distributed to each charging pile at the next time according to the remaining power at the current time, the weight of each charging pile and the actual output power of each charging pile.

The disclosure further provides a device for controlling power sharing of a cluster of charging piles, comprising:

a first module for calculating a remaining power of the cluster of charging piles at a current time according a total power upper limit of the cluster of charging piles at the current time, a total number of charging piles of the cluster of charging piles at the current time and an actual output power of each charging pile; and a second module for calculating a weight of each charging pile for distributing the remaining power according to performance state of each charging pile; obtaining a power output upper limit distributed to each charging pile at the next time according to the remaining power at the current time, the weight of each charging pile and the actual output power of each charging pile.

The disclosure further provides a system for controlling power sharing of a cluster of charging piles, comprising a charging station monitoring management system, a charging piles controller connected to the charging station monitoring management system, and a cluster of charging piles, the cluster of charging piles comprising a plurality of charging piles connected to the charging piles controller, wherein, the charging station monitoring management system is configured for acquiring a total power upper limit of the cluster of charging piles at a current time; and the charging piles controller is configured for calculating a remaining power of the cluster of charging piles at the current time according the total power upper limit at the current time, a total number of charging piles of the cluster of charging piles and an actual output power of each charging pile; calculating a weight of each charging pile for distributing the remaining power according to performance state of each charging pile; and obtaining a power output upper limit distributed to each charging pile at the next time according to the remaining power at the current time, the weight of each charging pile and the actual output power of each charging pile.

As can be known from the above solutions, advantages of the disclosure are as follows: the power output upper limit distributed to each charging pile are automatically adjusted in real time through the charging piles controller according to the shared total power upper limit set by the charging station monitoring management system, thereby avoiding that a part of charging piles become unavailable at an electricity consumption peak, and improving equipment utilization and load utilization of the charging station.

BRIEF DESCRIPTION OF THE DRAWINGS

FIG. 2 is a flow diagram of a method for controlling power sharing of a cluster of charging piles in one embodiment of the disclosure.

DETAILED DESCRIPTION

To make the features and effects of the disclosure clearer, hereinafter detailed explanations are made with reference to examples and parameter explanations as well as the accompanying drawings. Moreover, it shall be noticed that in order to visually show details of flows, examples of charging with an AC current are made below, and usage scenario of the disclosure is not limited to charging with the AC current, but also a DC current.

Parameters involved in the disclosure include:

a total power upper limit of a charging station at time k: $P_{Total}(k)$ a total number of charging piles owned by the charging station: N an actual output power and a rated power of the i-th charging pile at time k: $P_{Real\_i}(k)$, $P_{Rated\_i}(k)$ a power output upper limit distributed to the i-th charging pile at time k+1: $P_{A\_i}(k+1)$ The total power upper limit of the charging station is less than a sum of rated powers of all charging piles:

$$P_{Total}(k) < \sum_{i=0}^{N-1} P_{Rated\_i}(k).$$

The actual output power of the charging pile at time k satisfies the following condition: $P_{Real\_i}(k) \leq P_{A\_i}(k+1)$.

In the embodiments of the disclosure, the total power upper limit $P_{Total}(k)$, the actual output power $P_{Real\_i}(k)$, the rated power $P_{Rated\_i}(k)$ and the distributed power output upper limit $P_{A\_i}(k)$ are all AC powers in one preferable embodiment.

Figure 1:
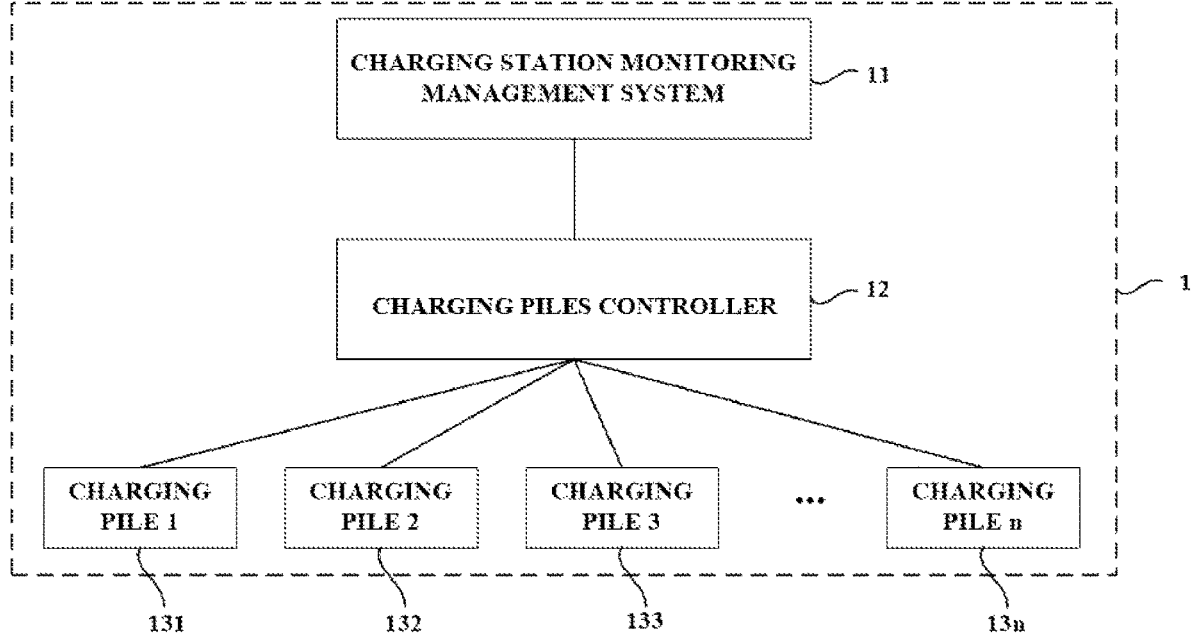
FIG. 1 is a block diagram of a system for controlling power sharing of a cluster of charging piles in one embodiment of the disclosure.

The disclosure provides a method and system for controlling power sharing of a cluster of charging piles, and a block diagram of the system is shown in FIG. 1. The system communication network scheme may use modes such as Ethernet, serial port, WiFi, Bluetooth, Zigbee and wireless communication module. The system 10 for controlling power sharing of a cluster of charging piles in the disclosure comprises a charging station monitoring management system 11, a charging piles controller 12 connected to the charging station monitoring management system, and a cluster of charging piles. The cluster of charging piles comprises a plurality of charging piles, i.e., a charging pile 131 (a charging pile 1), a charging pile 132 (a charging pile 2) and a charging pile 133 (a charging pile 3), connected to the charging piles controller 12. The charging station monitoring management system 11 is configured for acquiring a total power upper limit $P_{Total}(k)$ of the cluster of charging piles at a current time (time k), and the total power upper limit $P_{Total}(k)$ is transmitted to the charging piles controller 12 through anyone of the above communication schemes. The charging piles controller 12 is configured for calculating a remaining power $\Delta P(k)$ of the cluster of charging piles at the current time according the total power upper limit $P_{Total}(k)$ at the current time, and the total number N of charging piles of the cluster of charging piles and an actual output power $P_{Real\_i}(k)$ of each charging pile; calculating a weight of each charging pile for distributing the remaining power according to performance state of each charging pile; and obtaining a power output upper limit (the maximum available power) $P_{A\_i}(k+1)$ distributed to each charging pile at the next time (time k+1) according to the remaining power $\Delta P(k)$, the weight of each charging pile and the actual output power $P_{Real\_i}(k)$ of each charging pile. The power output upper limit can be further transmitted to each charging pile or devices (e.g., electric vehicles, etc.) to be charged through the above communication modes, and the electric vehicle extracts electricity from the corresponding charging pile according to a real demand power, but electricity extracted by the electric vehicle (i.e., the actual output power of the charging pile) cannot exceed the power output upper limit of the corresponding charging pile at this time obtained by calculation of the charging piles controller 12.

It can be understood that the demand power of the electric vehicle changes in real time, such as, along with change of SOC of the battery. Therefore, the actual output power of the charging pile also may change in real time.

The charging station monitoring management system 11 is further configured for detecting and updating the total power upper limit and/or the actual output power of each charging pile at every time. In some embodiments, a power detection device also can be provided for detecting the actual output power of each charging pile in real time, and transmitting the detected actual output power of each charging pile to the charging piles controller. In this embodiment, the charging piles controller 12 is configured for calculating the power output upper limit distributed to each charging pile at the next time according to the updated total power upper limit at every time, the total number of charging piles and the actual output power of each charging pile to limit the maximum output power of each charging pile, and continuously repeats the above process to complete dynamic distribution of powers of the charging station.

In one embodiment, the charging piles controller 12 is configured for calculating the remaining power $\Delta P(k)$ at the current time according to the following formula:

$$\Delta P(k) = P_{Total}(k) - \sum_{i=0}^{N-1} P_{Real\_i}(k)$$

wherein $P_{Total}(k)$ is the total power upper limit at time k, $P_{Real\_i}(k)$ is the actual output power of the i-th charging pile at time k, and N is the total number of charging piles at time k.

In one embodiment, the performance state of each charging pile is a rated power $P_{Rated\_i}(k)$ of each charging pile, and the charging piles controller 12 is particularly configured for:

when an initial time k=0, the actual output power of each charging pile is 0, and obtaining the power output upper limit distributed to each charging pile at time k+1 when the initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Rated\_i}(k)}{\sum_{i=0}^{N-1} P_{Rated\_i}(k)} + P_{Real\_i}(k)$$

wherein $P_{A\_i}(k+1)$ is the power output upper limit distributed to the i-th charging pile at time k+1, and $P_{Rated\_i}(k)$ is a rated power of the i-th charging pile, where k is an integer greater than or equal to 0.

At the initial time of the system, the actual output power of each charging pile is $P_{Real\_i}(0)=0$.

In another embodiment, the performance state of each charging pile is the actual output power $P_{Real\_i}(k)$ of each charging pile at the current time, and the charging piles controller 12 is particularly configured for:

when an initial time k=0, the actual output power of each charging pile is 0, and obtaining the power output upper limit distributed to each charging pile at time k+1 when the initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Real\_i}(k)}{\sum_{i=0}^{N-1} P_{Real\_i}(k)} + P_{Real\_i}(k)$$

wherein $P_{A\_i}(k+1)$ is the power output upper limit distributed to the i-th charging pile at time k+1, and $P_{Rated\_i}(k)$ is a rated power of the i-th charging pile.

In another embodiment, the performance state of each charging pile is a variation of the actual output power of each charging pile at the current time, and the charging piles controller 12 is particularly configured for:

obtaining a variation $\Delta P_{Real\_i}(k)$ of the actual output power of each charging pile at time k when k≥1 according to the following formula:

$$\Delta P_{Real\_i}(k) = P_{Real\_i}(k) - P_{Real\_i}(k-1)$$

when an initial time k=0, the actual output power of each charging pile is 0, and obtaining the power output upper limit distributed to each charging pile at time k+1 when the initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{\Delta P_{Real\_i}(k)}{\sum_{i=0}^{N-1} \Delta P_{Real\_i}(k)} + P_{Real\_i}(k)$$

wherein $P_{A\_i}(k+1)$ is the power output upper limit distributed to the i-th charging pile at time k+1, and when $$\sum_{i=0}^{N-1} \Delta P_{Real\_i}(k)$$

is 0, the remaining power $\Delta P(k)$ is divided equally according to the total number N of charging piles.

In the above embodiments, the total power upper limit $P_{Total}(k)$ is less than a sum of rated powers $$\sum_{i=0}^{N-1} P_{Rated\_i}(k)$$

of all charging piles, and the power output upper limit $P_{A\_i}(k)$ distributed to each charging pile is less than or equal to the rated power $P_{Rated\_i}(k)$ of the corresponding charging pile.

Based on the system for controlling power sharing of a cluster of charging piles, the disclosure further provides a device for controlling power sharing of a cluster of charging piles, comprising:

a first module for calculating a remaining power $\Delta P(k)$ of the cluster of charging piles at a current time according a total power upper limit $P_{Total}(k)$ of the cluster of charging piles at the current time, and the total number N of charging piles of the cluster of charging piles at the current time and an actual output power $P_{Real\_i}(k)$ of each charging pile; and a second module for calculating a weight of each charging pile for distributing the remaining power according to performance state of each charging pile; obtaining a power output upper limit $P_{A\_i}(k+1)$ distributed to each charging pile at the next time according to the remaining power $\Delta P(k)$ at the current time, the weight of each charging pile and the actual output power $P_{Real\_i}(k)$ of each charging pile.

The second module is further configured for updating one or more of the total power upper limit, the total number and the actual output power of the charging piles.

It can be understood that the device for controlling power sharing of a cluster of charging piles cyclically calls the first module and the second module. A frequency of calling can be set according to actual application scenarios, i.e., updating the total power upper limit, the total number of charging piles and the actual output power of each charging pile once every one preset time, and calculating the power output upper limit of each charging pile at the next time according to updated data to realize dynamic distribution of powers.

The first module is configured for calculating the remaining power ΔP(k) at the current time according to the following formula:

$$\Delta P(k) = P_{Total}(k) - \sum_{i=0}^{N-1} P_{Real\_i}(k)$$

wherein $P_{Total}(k)$ is the total power upper limit at time k, $P_{Real\_i}(k)$ is the actual output power of the i-th charging pile at time k, and N is the total number of charging piles at time k.

In one embodiment, the performance state of each charging pile is a rated power of each charging pile, and the second module is particularly configured for:

obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Rated\_i}(k)}{\sum_{i=0}^{N-1} P_{Rated\_i}(k)} + P_{Real\_i}(k).$$

Since the same sign in the disclosure represents the same meaning, and as for the meanings represented by the signs in the formulas, they are presented in the preceding contents, so repeated explanation is not made below.

In another embodiment, the performance state of each charging pile is the actual output power of each charging pile at the current time, and the step 2 is particularly configured for:

obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Real\_i}(k)}{\sum_{i=0}^{N-1} P_{Real\_i}(k)} + P_{Real\_i}(k).$$

In another embodiment, the performance state of each charging pile is a variation of the actual output power of each charging pile at the current time, and the step 2 is particularly configured for:

obtaining a variation $\Delta P_{Real\_i}(k)$ of the actual output power of each charging pile at time k when k≥1 according to the following formula:

$$\Delta P_{Real\_i}(k) = P_{Real\_i}(k) - P_{Real\_i}(k-1)$$

obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{\Delta P_{Real\_i}(k)}{\sum_{i=0}^{N-1} \Delta P_{Real\_i}(k)} + P_{Real\_i}(k).$$

When $$\sum_{i=0}^{N-1} \Delta P_{Real\_i}(k)$$

is 0, the remaining power ΔP(k) is divided equally according to the total number N of charging piles. That is, when the variation of the actual output power of all charging piles is 0, $$P_{A\_i}(k+1) = \Delta P(k) * \frac{1}{N} + P_{Real\_i}(k)$$

is satisfied.

The total power upper limit is less than a sum of rated powers of all charging piles, and the power output upper limit distributed to each charging pile is less than or equal to the rated power of the corresponding charging pile.

Hereinafter is a method embodiment corresponding to the system and device embodiments, and this embodiment may be carried out in cooperation with the above embodiments. Relevant technical details mentioned in the above embodiments are still effective in this embodiment, and in order to reduce repetition, details are not described here. Correspondingly, relevant technical details mentioned in this embodiment also may be applied to the above embodiments.

In the disclosure, the method for controlling power sharing adjusts the power output upper limit distributed to each charging pile cyclically by monitoring the total power upper limit of the cluster of charging piles and the actual output powers of each charging pile in real time, to dynamically adjust charging powers of each charging pile according to charging demands in the charging process.

In the disclosure, flows of the method for controlling power sharing are shown in FIG. 2, comprising follow steps.

Step 1, calculating a remaining power of the cluster of charging piles at a current time according a total power upper limit of the cluster of charging piles at the current time, the total number of charging piles of the cluster of charging piles at the current time and an actual output power of each charging pile.

Specifically, the total power upper limit $P_{Total}(k)$ distributed to the cluster of charging piles shall be acquired in real time, and the actual output power $P_{Real\_i}(k)$ of each charging pile at time k is acquired. Since the total power upper limit may change at different time periods, it shall be acquired once in every processing cycle, and since in an operating state of each charging pile, the actual output power of each charging pile also changes in real time, it also shall be acquired once in every processing cycle.

Step 2, calculating a weight of each charging pile for distributing the remaining power according to performance state of each charging pile; obtaining a power output upper limit distributed to each charging pile at the next time according to the remaining power at the current time, the weight of each charging pile and the actual output power of each charging pile.

Specifically, according to the total number N of charging piles of the charging station, the total power upper limit $P_{Total}(k)$, the actual output power $P_{Real\_i}(k)$ of each charging pile and the rated power $P_{Rated\_i}(k)$ of each charging pile, the disclosure provides the following three methods to calculate the power output upper limit $P_{A\_i}(k+1)$ distributed to the i-th charging pile at time k+1, and in specific implementation, any of the methods may be selected to calculate the power output upper limit $P_{A\_i}(k+1)$ distributed to the i-th charging pile at time k+1 according to actual demands:

The first method is to distribute the remaining power $\Delta P(k)$ according to the weight determined by the rated power of each charging pile.

The power output upper limit distributed to each charging pile at time k+1 when an initial time k=0 is obtained according to the following formula:

$$P_{A\_i}(k+1) = P_{Total}(k) * \frac{P_{Rated\_i}(k)}{\sum_{i=0}^{N-1} P_{Rated\_i}(k)}$$

The power output upper limit distributed to each charging pile at time k+1 when k>0 is obtained according to the following formula:

$$P_{A\_i}(k+1) = \Delta P(k) * \frac{P_{Rated\_i}(k)}{\sum_{i=0}^{N-1} P_{Rated\_i}(k)} + P_{Real\_i}(k)$$

In the formula, $$\Delta P(k) * \frac{P_{Rated\_i}(k)}{\sum_{i=0}^{N-1} P_{Rated\_i}(k)}$$

refers to distributing the remaining power $\Delta P(k)$ according to the weight of the rated power of each charging pile.

The second method is to distribute the remaining power $\Delta P(k)$ according to the weight determined by the actual output power of each charging pile at the current time.

The power output upper limit distributed to each charging pile at time k+1 when an initial time k=0 is obtained according to the following formula:

$$P_{A\_i}(k+1) = P_{Total}(k) * \frac{P_{Rated\_i}(k)}{\sum_{i=0}^{N-1} P_{Rated\_i}(k)}$$

The power output upper limit distributed to each charging pile at time k+1 when k>0 is obtained according to the following formula:

$$P_{A\_i}(k+1) = \Delta P(k) * \frac{P_{Real\_i}(k)}{\sum_{i=0}^{N-1} P_{Real\_i}(k)} + P_{Real\_i}(k)$$

$$\Delta P(k) * \frac{P_{Rated\_i}(k)}{\sum_{i=0}^{N-1} P_{Rated\_i}(k)}$$

In the formula, refers to distributing the remaining power $\Delta P(k)$ according to the weight of the actual output power of each charging pile;

If the actual output power $P_{Real\_i}(k)$ of all charging piles is 0, the remaining power $\Delta P(k)$ is distributed equally.

If the actual output power $P_{Real\_i}(k)$ of a part of charging piles is 0, the charging piles of which $P_{Real\_i}(k)$ is not 0 firstly distribute the remaining power $\Delta P(k)$ according to the weight related to the actual output power, and if there are remaining powers after distribution, the charging piles of which $P_{Real\_i}(k)$ is 0 equally distribute these remaining powers.

The third method is to distribute the remaining power $\Delta P(k)$ according to the weight determined by a variation of the actual output power of each charging pile at the current time.

A variation $\Delta P_{Real\_i}(k)$ of the actual output power of each charging pile at time k when k>0 is obtained according to the following formula:

$$\Delta P_{Real\_i}(k) = P_{Real\_i}(k) - P_{Real\_i}(k-1)(Min(\Delta P_{Real\_i}(k)) = 0)$$

The power output upper limit distributed to each charging pile at time k+1 when an initial time k=0 is obtained according to the following formula:

$$P_{A\_i}(k+1) = P_{Total}(k) * \frac{P_{Rated\_i}(k)}{\sum_{i=0}^{N-1} P_{Rated\_i}(k)}$$

The power output upper limit distributed to each charging pile at time k+1 when k>0 is obtained according to the following formula:

$$P_{A\_i}(k+1) = \Delta P(k) * \frac{\Delta P_{Real\_i}(k)}{\sum_{i=0}^{N-1} \Delta P_{Real\_i}(k)} + P_{Real\_i}(k)$$

When $$\sum_{i=0}^{N-1} \Delta P_{Real\_i}(k)$$

is 0, the remaining power $\Delta P(k)$ is divided equally according to the total number N of charging piles.

In the formula, $$\Delta P(k) * \frac{P_{Rated\_i}(k)}{\sum_{i=0}^{N-1} P_{Rated\_i}(k)}$$

refers to distributing the remaining power $\Delta P(k)$ according to the weight related to the variation of the actual output power of each charging pile at the current time.

Figure 3:
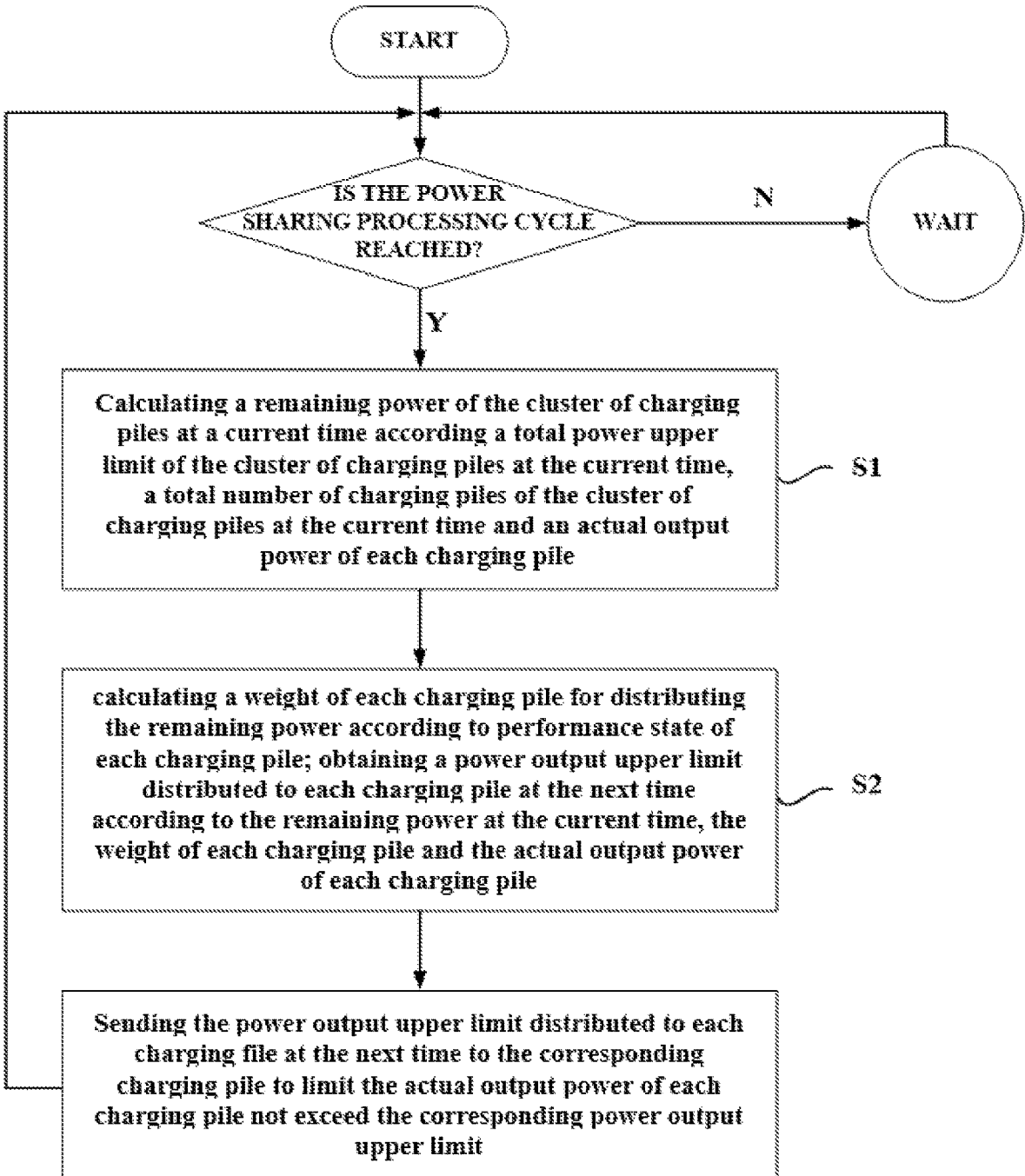
FIG. 3 is a flow diagram of a method for dynamically adjusting powers of each charging pile at a charging station in one embodiment of the disclosure.

If the actual output power $P_{Real\_i}(k)$ of all charging piles is 0, the remaining power $\Delta P(k)$ is distributed equally;

If the actual output power $P_{Real\_i}(k)$ of a part of charging piles is 0, the charging piles of which $P_{Real\_i}(k)$ is not 0 firstly distribute the remaining power $\Delta P(k)$ according to the weight determined by the variation of the actual output power, and if there are remaining powers after distribution, the charging piles where $P_{Real\_i}(k)$ is 0 distribute these remaining powers equally. As shown in FIG. 3, the charging piles controller sends the power output upper limit at the next time calculated in the step 2 to the corresponding charging pile, such that the actual output power of each charging pile at the next time does not exceed the corresponding power output upper limit, and real-time dynamic adjustment to the powers of each charging pile at the charging station is realized by executing cyclically the step 1 and the step 2. Hereinafter the detailed examples use the first method to realize dynamic distribution of the powers of the charging station:

Example I

Explanations to Example Scenario I a) the total power upper limit of the cluster of charging piles is constant, $P_{Total}=600$ kW;

b) the total number of charging piles N=4;

c) the rated power of each charging pile $P_{Rated\_i}(k)=350$ kW;

d) the real demand powers of each charging pile are $P_{Request\_0}(k)=100$ kW, $P_{Request\_1}(k)=100$ kW, $P_{Request\_2}(k)=200$ kW and $P_{Request\_3}(k)=0$ kW sequentially, and assuming that the real demand powers of each charging pile do not change in a short time.

The process of dynamic distribution of powers of each charging pile is as follows:

| Time k | Charging pile 0 $P_{Real\_0}(k)(P_{A\_0}(k+1))$ | Charging pile 1 $P_{Real\_1}(k)(P_{A\_1}(k+1))$ | Charging pile 2 $P_{Real\_2}(k)(P_{A\_2}(k+1))$ | Charging pile 3 $P_{Real\_3}(k)(P_{A\_3}(k+1))$ |
|---|---|---|---|---|
| 0 | 0(150) | 0(150) | 0(150) | 0(150) |
| 1 | ↑100(225) | 0(125) | 0(125) | 0(125) |
| 2 | 100(200) | ↑100(200) | 0(100) | 0(100) |
| 3 | 100(175) | 100(175) | ↑100(175) | 0(75) |
| 4 | 100(157) | 100(156) | ↑175(231) | 0(56) |
| 5 | 100(150) | 100(150) | ↑200(250) | 0(50) |
| 6 | 100(150) | 100(150) | 200(250) | 0(50) |
| . . . | | | | |

In the table, starting from time 6, $P_{Real\_i}(k)$ and $P_{A\_i}(k+1)$ remain stable, i.e., the actual output power of each charging pile and the power output upper limit at the next time obtained by calculation in two adjacent updated cycles do not change any longer.

Example II

Explanations to Example Scenario II a) change occurs in the scenario I, i.e., a temporary steady state before dynamic adjustment of the powers in scenario II is the time 6 in the scenario I;

b) firstly, the charging pile 3 starts charging, and the real demand power of the charging pile 3 is 350 kW, i.e., the real demand powers of each charging pile are $P_{Request\_0}(k)=100$ kW, $P_{Request\_1}(k)=100$ kW, $P_{Request\_2}(k)=200$ kW and $P_{Request\_3}(k)=350$ kW.

The process of dynamic distribution of powers of each charging pile is as follows:

| Time k | Charging pile 0 $P_{Real\_0}(k)(P_{A\_0}(k+1))$ | Charging pile 1 $P_{Real\_1}(k)(P_{A\_1}(k+1))$ | Charging pile 2 $P_{Real\_2}(k)(P_{A\_2}(k+1))$ | Charging pile 3 $P_{Real\_3}(k)(P_{A\_3}(k+1))$ |
|---|---|---|---|---|
| 0 | 100(150) | 100(150) | 200(250) | 0(50) |
| 1 | 100(138) | 100(138) | 200(237) | ↑50(87) |
| 2 | 100(129) | 100(128) | 200(228) | ↑87(115) |
| 3 | 100(122) | 100(121) | 200(221) | ↑115(136) |
| 4 | 100(116) | 100(116) | 200(216) | ↑136(152) |
| 5 | 100(112) | 100(112) | 200(212) | ↑152(164) |
| 6 | 100(109) | 100(109) | 200(209) | ↑164(173) |
| 7 | 100(107) | 100(107) | 200(207) | ↑173(179) |

-continued

| Time k | Charging pile 0 $P_{Real\_0}(k)(P_{A\_0}(k+1))$ | Charging pile 1 $P_{Real\_1}(k)(P_{A\_1}(k+1))$ | Charging pile 2 $P_{Real\_2}(k)(P_{A\_2}(k+1))$ | Charging pile 3 $P_{Real\_3}(k)(P_{A\_3}(k+1))$ |
|---|---|---|---|---|
| 8 | 100(106) | 100(105) | 200(205) | ↑179(184) |
| 9 | 100(104) | 100(104) | 200(204) | ↑184(188) |
| 10 | 100(103) | 100(103) | 200(203) | ↑188(191) |
| 11 | 100(103) | 100(102) | 200(202) | ↑191(193) |
| 12 | 100(102) | 100(102) | 200(202) | ↑193(194) |
| 13 | 100(102) | 100(102) | 200(201) | ↑194(195) |
| 14 | 100(102) | 100(101) | 200(201) | ↑195(196) |
| 15 | 100(101) | 100(101) | 200(201) | ↑196(197) |
| 16 | 100(101) | 100(101) | 200(201) | ↑197(197) |
| 17 | 100(101) | 100(101) | 200(201) | 197(197) |
| . . . | | | | |

In the table, starting from time 17, $P_{Real\_i}(k)$ and $P_{A\_i}(k+1)$ remain stable, and the power output upper limit distributed to the charging pile 3 is 197 kW, which cannot satisfy the power demand of 350 kW, so the actual output power of the charging pile 3 is 197 kW.

c) then, the charging pile 2 stops charging, i.e., the real demand power of the charging pile 2 is $P_{Request\_2}(k)=0$ kW, and the process of dynamic distribution of powers of each charging pile is as follows:

| Time k | Charging pile 0 $P_{Real\_0}(k)(P_{A\_0}(k+1))$ | Charging pile 1 $P_{Real\_1}(k)(P_{A\_1}(k+1))$ | Charging pile 2 $P_{Real\_2}(k)(P_{A\_2}(k+1))$ | Charging pile 3 $P_{Real\_3}(k)(P_{A\_3}(k+1))$ |
|---|---|---|---|---|
| 0 | 100(101) | 100(101) | 200(201) | 197(197) |
| 1 | 100(151) | 100(151) | ↓0(51) | ↑197(247) |
| 2 | 100(139) | 100(138) | 0(38) | ↑247(285) |
| 3 | 100(129) | 100(129) | 0(29) | ↑285(313) |
| 4 | 100(122) | 100(122) | 0(22) | ↑313(334) |
| 5 | 100(117) | 100(117) | 0(16) | ↑334(350) |
| 6 | 100(117) | 100(117) | 0(16) | ↑350(350) |
| . . . | | | | |

In the table, starting from time 6, $P_{Real\_i}(k)$ and $P_{A\_i}(k+1)$ remain stable. As can be seen, after the charging pile 2 stops charging, according to the control algorithm of power sharing in the disclosure, the power output upper limit distributed to the charging pile 3 and the actual output power are both improved to finally satisfy the power demand of 350 kW.

Example III

Explanations to Example Scenario III a) change occurs in the scenario I, i.e., a temporary steady state before dynamic adjustment of the powers in scenario III is the time 6 in the scenario I;

b) the total power upper limit $P_{Total}(k)$ of the cluster of charging piles is changed from 600 kW to 500 kW, and the process of dynamic distribution of powers of each charging pile is as follows:

| Time k | Charging pile 0 $P_{Real\_0}(k)(P_{A\_0}(k+1))$ | Charging pile 1 $P_{Real\_1}(k)(P_{A\_1}(k+1))$ | Charging pile 2 $P_{Real\_2}(k)(P_{A\_2}(k+1))$ | Charging pile 3 $P_{Real\_3}(k)(P_{A\_3}(k+1))$ |
|---|---|---|---|---|
| 0 | 100(150) | 100(150) | 200(250) | 0(50) |
| 1 | 100(↓125) | 100(↓125) | 200(↓225) | 0(↓25) |
| . . . | | | | |

In the table, starting from time 1, $P_{Real\_i}(k)$ and $P_{A\_i}(k+1)$ remain stable, and when $P_{Total}(k)$ is changed from 600 kW to 500 kW, the remaining unused power (a difference between the power output upper limit distributed to the charging pile and the actual output power) distributed to each charging pile is changed from 50 kW to 25 kW.

Although the disclosure directs to above examples, detailed embodiments are only used to explain the disclosure, while not limiting the disclosure. Any skilled in the art may make some modifications and perfections without departing from concept and scope of the disclosure, so the scope protected by the appended claims of the disclosure is determined by the attached claims.

What is claimed is:

1. A method for controlling power sharing of a cluster of charging piles, comprising:

step 1, calculating a remaining power of the cluster of charging piles at a current time according a total power upper limit of the cluster of charging piles at the current time, a total number of charging piles of the cluster of charging piles at the current time and an actual output power of each charging pile;

step 2, calculating a weight of each charging pile for distributing the remaining power according to performance state of each charging pile; obtaining a power output upper limit distributed to each charging pile at the next time according to the remaining power at the current time, the weight of each charging pile and the actual output power of each charging pile; and transmitting the obtained power output upper limit distributed to each charging pile to a plurality of charging piles in the cluster of charging piles to adjust the power output upper limits of the plurality of charging piles, wherein the weight is determined according to one of a rated power of the charging pile, an actual output power of the charging pile at the current time and a variation of the actual output power of the charging pile at the current time.

2. The method according to claim 1, wherein the step 2 further comprises updating the total power upper limit, the total number of charging pipes and the actual output power, and wherein the step 1 and the step 2 are executed cyclically.

3. The method according to claim 1, wherein the step 1 comprises calculating the remaining power $\Delta P(k)$ at the current time according to the following formula:

$$\Delta P(k) = P_{Total}(k) - \sum_{i=0}^{N-1} P_{Real\_i}(k)$$

wherein $P_{Total}(k)$ is the total power upper limit at time k, $P_{Real\_i}(k)$ is the actual output power of the i-th charging pile at time k, and N is the total number of charging piles at time k.

4. The method according to claim 3, wherein, the performance state in the step 2 is the rated power of the charging pile, and the step 2 comprises:

obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Rated\_i}(k)}{\sum_{i=0}^{N-1} P_{Rated\_i}(k)} + P_{Real\_i}(k)$$

wherein $P_{A\_i}(k+1)$ is the power output upper limit distributed to the i-th charging pile at time k+1, and $P_{Rated\_i}(k)$ is a rated power of the i-th charging pile.

5. The method according to claim 3, wherein, the performance state in the step 2 is the actual output power of the charging pile at the current time, and the step 2 comprises:

obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Real\_i}(k)}{\sum_{i=0}^{N-1} P_{Real\_i}(k)} + P_{Real\_i}(k)$$

wherein $P_{A\_i}(k+1)$ is the power output upper limit distributed to the i-th charging pile at time k+1, and $P_{Rated\_i}(k)$ is a rated power of the i-th charging pile.

6. The method according to claim 3, wherein the performance state in the step 2 is the variation of the actual output power of the charging pile at the current time, and the step 2 comprises:

obtaining a variation $\Delta P_{Real\_i}(k)$ of the actual output power of each charging pile at time k according to the following formula:

$$\Delta P_{Real\_i}(k) = P_{Real\_i}(k) - P_{Real\_i}(k-1)$$

obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{\Delta P_{Real\_i}(k)}{\sum_{i=0}^{N-1} \Delta P_{Real\_i}(k)} + P_{Real\_i}(k)$$

wherein $P_{A\_i}(k+1)$ is the power output upper limit distributed to the i-th charging pile at time k+1, $P_{Rated\_i}(k)$ is a rated power of the i-th charging pile, and when $$\sum_{i=0}^{N-1} \Delta P_{Real\_i}(k)$$

is 0, the remaining power $\Delta P(k)$ is divided equally according to the total number of charging piles.

7. The method according to claim 1, wherein the total power upper limit is less than a sum of rated powers of all charging piles, and the power output upper limit distributed to each charging pile is less than or equal to the rated power of the corresponding charging pile.

8. A system for controlling power sharing of a cluster of charging piles, comprising a charging station monitoring management system, a charging piles controller connected to the charging station monitoring management system, and a cluster of charging piles, the cluster of charging piles comprising a plurality of charging piles connected to the charging piles controller, wherein, the charging station monitoring management system is configured for acquiring a total power upper limit of the cluster of charging piles at a current time; and the charging piles controller is configured for calculating a remaining power of the cluster of charging piles at the current time according the total power upper limit at the current time, a total number of charging piles of the cluster of charging piles and an actual output power of each charging pile; calculating a weight of each charging pile for distributing the remaining power according to performance state of each charging pile; and obtaining a power output upper limit distributed to each charging pile at the next time according to the remaining power at the current time, the weight of each charging pile and the actual output power of each charging pile; and transmitting the obtained power output upper limit distributed to each charging pile to the plurality of charging piles to adjust the power output upper limits of the plurality of charging piles, wherein the weight is determined according to one of a rated power of the charging pile, an actual output power of the charging pile at the current time and a variation of the actual output power of the charging pile at the current time.

9. The system according to claim 8, wherein the charging piles controller is configured for calculating the remaining power $\Delta P(k)$ at the current time according to the following formula:

$$\Delta P(k) = P_{Total}(k) - \sum_{i=0}^{N-1} P_{Real\_i}(k)$$

wherein $P_{Total}(k)$ is the total power upper limit at time k, $P_{Real\_i}(k)$ is the actual output power of the i-th charging pile at time k, and N is the total number of charging piles at time k.

10. The system according to claim 9, wherein
the performance state is the rated power of the charging piles; and
the charging piles controller is configured for:
   obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Rated\_i}(k)}{\sum_{i=0}^{N-1} P_{Rated\_i}(k)} + P_{Real\_i}(k)$$

wherein $P_{A\_i}(k+1)$ is the power output upper limit distributed to the i-th charging pile at time k+1, and $P_{Rated\_i}(k)$ is a rated power of the i-th charging pile.

11. The system according to claim 9, wherein,
the performance state is the actual output power of the charging pile at the current time; and
the charging piles controller is configured for:
   obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{P_{Real\_i}(k)}{\sum_{i=0}^{N-1} P_{Real\_i}(k)} + P_{Real\_i}(k)$$

wherein $P_{A\_i}(k+1)$ is the power output upper limit distributed to the i-th charging pile at time k+1, and $P_{Rated\_i}(k)$ is a rated power of the i-th charging pile.

12. The system according to claim 9, wherein
the performance state is the variation of the actual output power of the charging pile at the current time; and
the charging piles controller is configured for:
   obtaining a variation $\Delta P_{Real\_i}(k)$ of the actual output power of each charging pile at time k according to the following formula:

$\Delta P_{Real\_i}(k) = P_{Real\_i}(k) - P_{Real\_i}(k-1)$ obtaining the power output upper limit distributed to each charging pile at time k+1 when an initial time k=0 according to the following formula:

$$P_{A\_i}(k+1) = P_{Total}(k) * \frac{P_{Rated\_i}(k)}{\sum_{i=0}^{N-1} P_{Rated\_i}(k)}$$

obtaining the power output upper limit distributed to each charging pile at time k+1 when k>0 according to the following formula:

$$P_{A\_i}(k+1) = \Delta P(k) * \frac{\Delta P_{Real\_i}(k)}{\sum_{i=0}^{N-1} \Delta P_{Real\_i}(k)} + P_{Real\_i}(k)$$

wherein $P_{A\_i}(k+1)$ is the power output upper limit distributed to the i-th charging pile at time k+1, $P_{Rated\_i}(k)$ is a rated power of the i-th charging pile, and when $$\sum_{i=0}^{N-1} \Delta P_{Real\_i}(k)$$

is 0, the remaining power $\Delta P(k)$ is divided equally according to the total number of charging piles.

13. The system according to claim 8, wherein the charging station monitoring management system is further configured for updating the total power upper limit at every time.

* * * * *